Patented Feb. 9, 1954

2,668,751

UNITED STATES PATENT OFFICE 2,668,751

PROCESS FOR PRODUCTION OF ALUMINA

John L. Porter, Baton Rouge, La., assignor to Kaiser Aluminum & Chemical Corporation, Oakland, Calif., a corporation of Delaware No Drawing. Application December 30, 1949, Serial No. 136,161

12 Claims. (Cl. 23—143)

This invention relates to the production of of alumina from a particular type of aluminous ore. More particularly, the invention relates to an improved process for the extraction of alumina from aluminous ores containing mixtures of alumina trihydrate (Gibbsite) and alumina monohydrate (Boehmite) under digestion conditions conforming substantially to the standard American Bayer process.

The standard Bayer process as used in America was developed for extraction of high grade bauxites, such as Surinam and Arkansas bauxites, containing substantially all of the available alumina in the form of the trihydrate (Gibbsite). In this conventional process, such ores are digested in caustic aluminate liquor of moderate caustic concentrations not exceeding about 150 grams per liter NaOH at temperatures of from about 290 to 300° F. (145-150° C.) to give a pregnant liquor of high alumina-to-caustic ratio (A/C), for example, $Al_2O_3/NaOH$ of about .800 to .850 (weight basis). The trihydrate is extracted substantially completely under these conditions in a short time, for example, about one-half hour to not substantially more than one hour. The processing time and temperature are sufficient to insure substantially complete desilication.

In Europe, where the available bauxites of France, Styria, etc. contain substantially all of the available alumina in the form of Boehmite (alumina monohydrate), much more rigorous conditions must be employed for extraction. In the conventional European practice, caustic concentrations of from about 250 to 300 or more grams per liter are employed for the ore digestion at temperatures in excess of 350° F. up to 400° F. (about 175 to 200° C.) to give a pregnant liquor of much lower alumina-to-caustic ratio not exceeding about .750. In addition, the digestion time must be extended to about three to four hours.

The processing of new sources of lower grade aluminous ores is becoming increasingly important as the supplies of high grade bauxites diminish. Thus, this invention is particularly directed toward a solution of the unique difficulties encountered in the extraction of alumina from newly developed sources of aluminous ores containing mixtures of alumina trihydrate (Gibbsite) and alumina monohydrate (Boehmite) such as the West Indian bauxites or laterites.

The substantially complete extraction of the available trihydrate alumina together with a portion of the alumina monohydrate from ores containing mixtures of Gibbsite and Boehmite by means of pressure digestion with caustic aluminate liquor under conditions of temperature, time and concentrations conforming substantially to those utilized for the extraction of high-grade Arkansas or Surinam trihydrate bauxites presents problems not encountered with the latter bauxites.

It has been found that during digestion raw aluminous ore, containing both Gibbsite and Boehmite, shows a progressive loss in available alumina with an increasing charging ratio, that is, the calculated alumina-to-caustic weight ratio ($Al_2O_3/NaOH$) to be attained in the pregnant liquor based upon the rate of feed of fresh ore. This loss also progressively increases with increase in digestion temperature and time. It has been further demonstrated that this loss is attended by a substantial transformation of the more soluble trihydrate (Gibbsite) to the less soluble monohydrate alumina (Boehmite). This phenomena is herein designated by the term "reversion."

It appears that as digestion of the ore in the caustic aluminate liquor occurs and the alumina-to-caustic ratio increases, deposition of dissolved alumina from the caustic aluminate solution in the form of monohydrate (Boehmite) takes place on crystals of undissolved monohydrate. The degree of this reversion is very significant at the normal operating temperatures of about 150° C. for the standard American Bayer process and increases with longer digestion times at such temperatures. Thus, previously extracted available alumina is lost with the red mud and the total soluble alumina in the liquor decreases. This, in turn, prevents operation at the desirable maximum charging ratios of from about .800 to .850 and lowers the yield of alumina per cycle.

While not limiting this reversion phenomena to any particular theory or mechanism it appears that the crystals of undissolved monohydrate from the ore, which are present due to the fact that the liquor has become saturated or supersaturated with respect to monohydrate (Boehmite) at the normal digestion temperatures of about 150° C. (300° F.), act as nuclei for deposition of alumina from the liquor in the form of monohydrate, even though the liquor is unsaturated with respect to trihydrate.

Deviation from the standard American Bayer method and an adoption of the European conditions involving the lower charging ratios of alumina to caustic, higher temperatures, higher caustic concentrations, and longer digestion times would no doubt obviate the difficulty to some extent. However, the American Bayer process possesses many critical advantages over the European practice. The high alumina-to-caustic charging ratios permit recovery of a higher yield of alumina per cycle. At the European charging ratios, retention time in the precipitators must be increased fourfold to obtain the same yield. The lower digestion time (e. g. one-half hour compared to three) vastly increases the throughput per plant unit. The lower temperatures require less steam consumption and obviate the necessity of high pressure digesters. The lower caustic concentrations eliminate the necessity of diluting the pregnant liquor before filtering to remove the red mud and precipitating the alumina. Reconcentration of the caustic liquor for ore digestion and large evaporative capacity in the plant are in turn not required. Furthermore, application of the European process to aluminous ores of relatively high Gibbsite content is not feasible or desirable simply because trihydrate extraction ordinarily should not require such rigorous and obviously disadvantageous conditions.

Digestion to a high charging ratio but at lower temperatures and reduced retention time would tend to minimize the alumina loss due to reversion, but would represent conditions unsatisfactory for adequate desilication.

It is therefore, a primary object and purpose of the invention to provide an improved process for the extraction of alumina from aluminous ores containing mixtures of alumina trihydrate (Gibbsite) and alumina monohydrate (Boehmite) in which alumina is extracted to produce a green liquor having a high alumina-to-caustic ratio while eliminating reversion to the less soluble alumina monohydrate (Boehmite) and resulting loss of available Gibbsite. A further object is to provide a process for producing alumina from aluminous ores of lower grade containing alumina monohydrate (Boehmite) in admixture with the trihydrate (Gibbsite) whereby the ore may be charged to an optimum alumina-to-caustic ratio and digested under conditions of temperature and time to insure efficient desilication, while avoiding loss of soluble alumina by deposition thereof from the liquor as monohydrate. A more specific object is to provide an improved process for treating aluminous ores having a major proportion of the available alumina in the form of trihydrate in admixture with monohydrate alumina wherein the total available alumina content extracted is increased by inhibiting reversion of soluble alumina to insoluble monohydrate and by increasing the solubility of the monohydrate under prevailing digestion conditions.

Another object is to provide an improved process of extracting substantailly all of the trihydrate alumina and a portion of the monohydrate from ores containing mixtures of the same wherein the digestion conditions conform substantially to the standard American Bayer process.

It has been discovered according to the invention that the foregoing objects and other advantages set forth below are attained by calcining the aluminous ore before digestion to a residual ignition loss of from about 2 to 5%. It has been found that this calcination inhibits reversion of the more soluble Gibbsite (present as dissolved $Al_2O_3$) into the much less soluble Boehmite and permits operation at a high alumina-to-caustic ratio with a minimum loss of available Gibbsite or soluble alumina under digest conditions of temperature and time sufficient for substantially complete desilication.

The calcination appears also to increase to some extent the solubility of the Boehmite or monohydrate under the prevailing conditions of digestion.

Although the invention is not limited to the following proposed mechanism or any other particular theory, it appears that the particular calcination of this type of aluminous ore, such as West Indian bauxites containing a mixture of Gibbsite and Boehmite alters or destroys the crystal structure of the monohydrate so that nuclei for the deposition of alumina in the form of monohydrate (Boehmite) from the caustic aluminate liquor are no longer present.

Prior to the invention, predigestion calcination of high-grade Gibbsite bauxites, that is, ores containing substantially all of the available alumina in trihydrate form was generally regarded as undesirable in that an appreciable loss of available alumina resulted, apparently due to a reduction in the solubility of the alumina. On the other hand, it has been common practice to calcine the Boehmite bauxites of Europe before digestion when processed under conditions in which the monohydrate alumina is extracted and recovered. However, the European practice is not related to the problem successfully solved by the present invention. In the light of the observations in regard to the adverse effect of calcination on high grade Gibbsite bauxites, the success attending this invention may clearly be characterized as unexpected.

The process of the invention generally comprises calcining the mixed Gibbsite-Boehmite ore to a residual ignition loss of from about 2 to about 5% at temperatures of from about 400 to about 550° C. and thereafter extracting the available alumina under conditions conforming substantially to the standard American Bayer process, that is, digesting the ore in caustic aluminate liquor having a caustic concentration not exceeding about 160 grams per liter NaOH at temperatures not exceeding about 170° C. to a high charging ratio on the order of about .800 to about .850.

The process is particularly applicable to aluminous ores having a major portion of the total available alumina in the trihydrate form (Gibbsite), since ores containing a major portion of monohydrate alumina (Boehmite) may perhaps more advantageously be subjected to digestion under the European conditions for simultaneous extraction of both monohydrate and trihydrate alumina. Any minor amount of monohydrate may be present in the ores treated by the present invention with the beneficial results varying in degree depending on the monohydrate content. Aluminous ores containing ony a few percent of the total available alumina in the form of monohydrate are more amenable to extraction when calcined before digestion according to the invention. The term "minor," as used in the specification and claims with respect to the amount of monohydrate, includes from just below about 50% to any small percentage of monohydrate which is sufficient to cause a loss of soluble alumina by reversion during digestion. Typical ores which may be advantageously processed are the West Indian bauxites or laterites, such as Jamaican bauxites in which about 70 to over 95% of the total available alumina is in the form of trihydrate or Gibbsite, the balance being Boehmite or monohydrate.

For those ores which contain an amount of monohydrate sufficient to economically justify a separate subsequent treatment of the ore residue for recovery of the balance of the monohydrate content, the conventional European conditions may be employed. A preferred alternative, however, is to subject the aluminous ore after calcination to a two stage digestion process as disclosed and claimed in my copending application S. N. 109,640 filed August 11, 1949 whereby the trihydrate and solubilized monohydrate is first extracted, and the insoluble undissolved monohydrate is then extracted from the red mud residue under American Bayer conditions of caustic concentration and temperature at a lower charging ratio, the alumina being recovered from the combined high alumina pregnant liquors of the two digestions.

The degree of calcination of the aluminous ore according to the invention is suitably expressed in terms of the residual ignition loss of the calcined material. The term residual ignition loss, as commonly used and understood, means the loss on ignition of a partially calcined material as determined by standard methods. It is defined as the residual amount of volatile matter in the original material that remains after partial calcination, and which is driven off on ignition to give a completely calcined material. It is generally and hereinbelow expressed as a percentage (%) by weight based on the weight of the original material. It has been determined that calcination to a residual ignition loss of from about 2 to about 5% will produce the desired result during digestion, namely prevention of loss of available alumina by deposition of soluble alumina from the liquor in the form of monohydrate and increase in monohydrate solubility. Calcination to less than about 2% ignition loss of the calcined residue should be avoided in order to prevent a decrease in solubility of available alumina trihydrate in the ore due to overcalcination of the ore. Undercalcination should also be avoided since the crystal structure of the monohydrate will not be sufficiently altered to prevent reversion of trihydrate. The residual ignition loss is preferably measured under conditions which prevent the adsorption of any water or water vapor by the calcined residue which is highly active. This measurement is made in accordance with standard commercial methods for chemical analysis of bauxite, alumina hydrate and alumina calcine as given in "Scott's Standard Methods of Chemical Analysis" by N. H. Furman, 5th ed., published by D. Van Nostrand Co. (1938), vol. I, pages 19 and 26.

Optimum results have been obtained on calcined residues having a residual ignition loss of from about 2.5 to 4%, and accordingly this range is preferred.

As indicated above, the degree of calcination is critical and therefore, the manner in which the calcination is effected is important to insure uniform calcination of substantially all particles of the ore. The residual ignition loss must be representative of that on all discrete particles and not merely an average loss of particles a portion of which are overcalcined and a portion undercalcined. Such precise calcination necessitates close control of the selected ultimate temperature as well as the time of exposure of the ore particles to such temperature. It has been found that this uniform degree of calcination may be accomplished by the use of a hearth furnace, or in a fluidized bed system, a novel and particularly advantageous method and apparatus for the latter operation being disclosed and claimed in a copending application.

The temperature range suitable for the predigestion calcination of the ore, as stated above, is from about 400 to about 550° C. Optimum results are obtained at temperatures of from about 450 to 525° C., the alteration of the monohydrate apparently occurring most readily in this range without unduly affecting trihydrate solubility. Accordingly, this range is preferred. The time period will, of course, vary with the selected temperature and is adjusted to the temperature employed to produce a calcined residue having the specified ignition loss. Heating must be prolonged in the region of a minimum temperature of about 400° C., while a shorter heating period is used at an upper temperature limit of about 550° C. In general, the residence time of the particles at these ultimate temperatures is from about one minute to about one hour. The time element will also vary with the apparatus employed since it depends on the rate of heat transfer. By the use of a flash calciner only a few seconds may be required to attain the desired uniform degree of calcination.

The process of the invention permits the extraction from the ore of substantially all of the alumina soluble under the prevailing conditions conforming to the conventional American Bayer conditions of temperature and caustic concentration at optimum charging ratios of alumina-to-caustic of about .800 to about .850. The upper limit of about .850 alumina-to-caustic ratio in the pregnant liquor represents a maximum limited by the conditions of clarification of the digested ore slurry wherein the liquor is clarified at atmospheric pressure, the pressure reduction causing a substantial cooling by flash evaporation of the green liquor containing the red mud. This alumina-to-caustic ratio represents the maximum degree of supersaturation of alumina in caustic soda which permits filtration of the pregant liquor at temperatures of about 200–210° F. without hydrolysis of the aluminate and precipitation of alumina on the filters.

Advantageously, the predigestion calcination, by inhibiting reversion of trihydrate, permits ore digestion at temperatures slightly higher than the normal American Bayer digest temperatures of about 140–150° C. (285–300° F.). Temperatures about 10 to 20° C. higher, or about 160 to 170° C. may be employed, thus reducing extraction time. However, temperatures of about 145–150° C. give excellent results.

The caustic concentration in the digest liquor may vary from about 120 to about 160 grams NaOH per liter (about 160 to 215 grams per liter expressed as causticized $Na_2CO_3$). The preferred concentration is about 140 grams of NaOH per liter. As in the usual practice, spent liquor from the alumina precipitators is used for digestion and such liquor normally has an alumina-to-caustic (A/C) ratio of from about .350 to not substantially more than .400.

The digestion time may be quite widely varied depending upon such factors as the particular ore, the caustic concentration and the temperature. In general, the preferred digestion time is from about 20 minutes to about 60 minutes. These times insure adequate desilication of the liquor at prevailing temperatures.

An additional advantage of the process is the tendency of the red-mud residue to settle more rapidly. Also the residue deflocculates and disperses on washing by the usual countercurrent decantation to a remarkably lesser degree than mud from a dried raw bauxite digest. Accordingly, a pregnant liquor filtrate of greater clarity is obtained.

The reversion of soluble trihydrate alumina to insoluble monohydrate alumina on digestion of mixed ores, and the effects of charging ratio, and digestion time on such reversion are amply demonstrated by the data shown in Table I. In addition, this table indicates how reversion is minimized by predigestion calcination of the ores. Surinam bauxite, the total available alumina of which consisted of trihydrate (Gibbsite), is included for comparison.

Both the raw and calcined ores were digested for the indicated times at 160° C. in an artificial spent liquor having a caustic concentration of 140 grams per liter NaOH and an alumina-to-caustic ($Al_2O_3$/NaOH) ratio of .360. The calcined ores were heated at the indicated temperatures for one hour. The values are in grams per 100 grams of bauxite.

TABLE I

| Material | Time of Digestion, min. | Charging Ratio, $Al_2O_3$/NaOH | Ratio of Liquor, $Al_2O_3$/NaOH | $Al_2O_3$ Extracted | Weight of Residue |
|---|---|---|---|---|---|
| 1. JM-3 raw bauxite | 20 | .954 | .888 | 33.15 | 46.4 |
| 2. JM-3 raw bauxite | 40 | .954 | .845 | 30.82 | 48.67 |
| 3. JM-3 raw bauxite | 60 | .954 | .833 | 29.56 | 50.28 |
| 4. JM-3 calcined 450° C | 20 | .954 | .910 | 35.59 | 41.66 |
| 5. JM-3 calcined 450° C | 40 | .954 | .928 | 36.43 | 40.84 |
| 6. JM-3 calcined 450° C | 60 | .954 | .934 | 36.65 | 40.13 |
| 7. JM-3 calcined 375° C | 60 | .954 | .810 | 30.86 | 47.82 |
| 8. JM-3 calcined 525° C | 60 | .954 | .938 | 36.96 | 40.2 |
| 9. Surinam raw bauxite | 20 | .954 | .922 | 52.19 | 20.69 |
| 10. Surinam calcined 450° C | 20 | .954 | .884 | 46.99 | 25.43 |
| 11. JM-3 raw bauxite | 60 | .822 | .791 | 36.07 | 41.36 |
| 12. JM-3 calcined 450° C | 60 | .822 | .823 | 40.18 | 36.05 |
| 13. JM-3 calcined 525° C | 60 | .822 | .811 | 38.76 | 37.52 |

The symbol JM-3 in Table I, above, designates a Jamaica bauxite having the following analysis:

|   | Per cent |
|---|---|
| LOI | 25.50 |
| $SiO_2$ | 2.85 |
| $Fe_2O_3$ | 20.13 |
| $TiO_2$ | 1.67 |
| Gibbsite $Al_2O_3$ | 37.32 |
| Boehmite $Al_2O_3$ | 7.11 |
| Available $P_2O_5$ | .14 |
| $V_2O_5$ | .092 |
| $Cr_2O_3$ | .135 |

The Gibbsite value is the $Al_2O_3$ available by bomb digest with spent liquor to a .795 charging ratio at 150° C. for twenty minutes. These are conditions favorable for maximum extraction of trihydrate alumina and are very similar to those used in a Bayer plant for processing high grade Gibbsite ores. The Boehmite is the soluble monohydrate obtained by difference between the total available alumina and trihydrate available from bomb digests with straight caustic and with spent liquor, respectively.

The charging ratio was that calculated from the known alumina and caustic concentrations of the digest liquor and an assumed 100% extraction of the available trihydrate alumina by selection of the proper amount of ore for digestion. This is the nominal charging ratio with no correction for loss of caustic on digestion by reaction with silica.

The high ratio of .954 was selected as about the highest value which one might reasonably expect to attain with no reversion and with complete extraction of the trihydrate alumina. This is still a few percent short of the equilibrium ratio at saturation for trihydrate alumina so any falling short of the charging ratio is a measure of the reversion taking place or of incomplete extraction. Any decrease in soluble alumina with time would be from reversion and any increase in alumina would be due to more complete extraction.

The actual alumina-to-caustic ratio was that of the pregnant liquor after digestion.

The results of treatment of the raw Jamaica bauxite of runs 1, 2 and 3 indicate a drop in the available alumina and an increase in the weight of the residue with increasing digestion time. Even for the twenty minute digestion at the very high charging ratio of .954 only 33.15 grams of soluble alumina per 100 grams of bauxite were obtained compared to 37.32 obtained with a normal .795 charging ratio used in the ore analysis, which demonstrates increase in reversion with increase in charging ratio.

The JM-3 bauxite calcined at 450° C. on the other hand indicates an increase of available alumina with time even at the .954 charging ratio, and a decrease in weight of the residue as shown by runs 4, 5 and 6.

Calcination at 375° C. is insufficient to alter the monohydrate as seen by the low available alumina and high residue weight of run 7.

Calcination at 525° C. in run 8 gave results very similar to those at 450° C. for 60 minutes digestion.

In contrast with the above, the Surinam bauxite of run 10 indicates a large drop in available aumina with calcination at 450° C., as compared to digestion of the raw dried Surinam ore of run 9.

In runs 11, 12 and 13 a charging ratio of .822 gave excellent comparative results and bears out the conclusion that reversion increases with increase in charging ratio. (Compare runs 3 and 11 on raw bauxite.) In runs 12 and 13, the available alumina was higher than 37.3, the value obtained by a bomb digest of raw ore under standard conditions. In the alkali extraction of raw bauxite at a temperature and time sufficient for both extraction and desilication of the caustic aluminate solution, there is inevitably some reversion if any monohydrate is present in the ore. The available trihydrate alumina on a bomb digest is then somewhat less than the true Gibbsite alumina content of the ore.

Thermal analyses of residues from digestion of Gibbsite-Boehmite ores, such as JM-3, in pregnant liquor present additional evidence indicating reversion. After a twenty minute digest at 160° C. the area of Gibbsite dehydration was, as would be expected, substantially smaller than that of the raw ore. However, after 40 and 60 minute digests there was no dip at all in the Gibbsite dehydration region at about 310° C. and a substantial increase appeared in the area of Boehmite dehydration at about 510° C.

In Table II the beneficial effect of calcination and the effect of reversion with digest time in decreasing the amount of soluble alumina, which lowers the weight ratio of alumina-to-caustic in the pregnant liquor, is well illustrated. The various forms and mixtures of alumina were digested with 150 ml. of artificial spent liquor at 160° C. for the indicated times. The spent liquor contained 47.3 grams per liter of soluble alumina and 132.4 grams per liter of NaOH giving an A/C or $Al_2O_3/NaOH$ ratio of .358.

In the first seven runs the solid material was charged in an amount just capable of giving, as closely as possible, a solution saturated with trihydrate alumina. In run 8 there was an excess of Surinam bauxite to give a saturated solution of as high a ratio as possible.

TABLE II

| Charge | Digestion Time, min. | Liquor Ratio, $Al_2O_3/NaOH$ | Percent of Trihydrate Dissolved from Charge |
|---|---|---|---|
| 1. 22 gms. alumina trihydrate | 10 | 21.5/19.9=1.08 | 100 |
| 2. 22 gms. alumina trihydrate | 30 | 21.04/19.9=1.057 | 97 |
| 3. 22 gms. trihydrate+5 gms. monohydrate | 30 | 18.23/19.9=.917 | 77.5 |
| 4. 22 gms. trihydrate+10 gms. monohydrate | 30 | 17.39/19.9=.872 | 71.4 |
| 5. 38 gms. JM-3 bauxite | 10 | 18.23/19.2=.950 | 78.7 |
| 6. 38 gms. JM-3 bauxite | 30 | 16.72/19.6=.854 | 67.9 |
| 7. 38 gms. JM-3 calcine | 30 | 18.16/19.0=.955 | 78.1 |
| 8. 38 gms. Surinam bauxite | 30 | 20.9/19.9=1.05 | 71.2 |

The pure trihydrate dropped .023 ratio point or 2.2% with increase of digestion time from 10 to 30 minutes. The raw Jamaica bauxite dropped .096 ratio point or 10.1% in the same time. The JM-3 calcine gave .101 ratio point or 11.8% higher at 30 minutes than the raw bauxite. The addition of pure monohydrate to the charge of trihydrate reduced the equilibrium ratio at 30 minutes from 1.057 to .917 and to .872 depending on the amount of monohydrate added. The Surinam bauxite gave the same ratio of 1.05 as the pure trihydrate at 30 minutes, thus indicating the relative insignificance of reversion with a Gibbsite ore.

These data clearly show the effect of the monohydrate, either pure synthetic or the natural Boehmite of the Jamaica bauxite, in lowering the alumina-to-caustic ratio with digestion time. The rate of this drop is proportional to the amount of monohydrate present.

These experiments show that calcination of the Jamaica bauxite inhibits this drop in alumina concentration (expressed as $Al_2O_3/NaOH$ ratio) with time, and gives a higher alumina concentration and extraction in a 30 minute digest of the calcine than of the raw bauxite.

The following example is merely illustrative of the process of the invention and is not intended to constitute a limitation thereof.

Example I

JM-3 bauxite (analysis given above) was placed in a cold muffle and brought up to temperature and held for sixty minutes at 450° C., the nominal temperature of the muffle as indicated by a Foxboro controller. 15 grams of the calcined bauxite were digested at 160° C. for 30 minutes in 100 ml. of artificial spent liquor having an alumina-to-caustic ratio of 49.5/137.6 or .358. The loss on ignition during calcination was 23.48 grams per 100 grams bauxite. The residual ignition loss of the calcine was 2.81%. The available $Al_2O_3$ was 38.83 and the A/C or alumina-to-caustic ratio of the pregnant liquor was .799.

The results of further extractions on calcined Jamaica bauxite (JM-3), showing the variation of trihydrate available alumina and A/C ratio in the pregnant liquor with the degree of calcination, are set forth below in Table III. The values are in grams per 100 grams of bauxite. The digestion conditions were the same in all cases as regards temperature and time, i. e., 160° C. for 30 minutes, but the charges differed slightly. The actual charges are given below for runs recorded in Table III:

Run Nos. 1–4 500° C. calcinations 13.5 gms. in 100 ml. of 51/132 g./l.[1]

Run Nos. 5–7 475° C. calcinations 13.5 gms. in 100 ml. of 51/132 g./l.

Run Nos. 8–10 450° C. calcinations 15 gms. in 100 ml. of 49.5/137.6 g./l.

Run No. 11 raw bauxite 23.8 gms. in 155 ml. of 53.1/136 g./l.

Run No. 12 450° C. calcination 23.8 gms. in 155 ml. of 53.1/136 g./l.

[1] 51/132 g./l. means an artificial spent liquor of 51 gms. $Al_2O_3$/l. and 132 gms. NaOH/l.

TABLE III

| Material | Temp. of Calcination, °C. | Time[1] of Calcination | LOI[2] on Calcination | LOI of Calcine | Avail. $Al_2O_3$ | Liquor Ratio, $Al_2O_3/NaOH$ | Weight of Residue |
|---|---|---|---|---|---|---|---|
| 1. JM-3 bauxite | 500 | 0 | 22.1 | 4.4 | 38.28 | .798 | 39.01 |
| 2. JM-3 bauxite | 500 | 10 | 23.6 | 2.66 | 38.10 | .789 | 38.44 |
| 3. JM-3 bauxite | 500 | 20 | 23.83 | 2.36 | 37.60 | .795 | 38.55 |
| 4. JM-3 bauxite | 500 | 30 | 23.92 | 2.25 | 37.48 | .788 | 39.39 |
| 5. JM-3 bauxite | 475 | 10 | 22.25 | 4.35 | 38.31 | .803 | 38.12 |
| 6. JM-3 bauxite | 475 | 30 | 23.28 | 3.06 | 38.64 | .800 | 37.23 |
| 7. JM-3 bauxite | 475 | 60 | 23.61 | 2.65 | 38.28 | .798 | 37.52 |
| 8. JM-3 bauxite | 450 | 10 | 19.06 | 8.14 | 37.68 | .789 | 38.89 |
| 9. JM-3 bauxite | 450 | 30 | 22.79 | 3.69 | 38.35 | .797 | 37.34 |
| 10. JM-3 bauxite | 450 | 60 | 23.48 | 2.81 | 38.83 | .799 | 37.0 |
| 11. JM-3 raw bauxite digested under similar conditions | | | | | 36.60 | .792 | 44.36 |
| 12. JM-3 bauxite | 450 | 60 | | | 38.79 | .815 | 38.96 |

[1] In minutes at full temperature.
[2] LOI=loss on ignition.

In all cases where the loss on ignition of the residue was within the preferred range of 2.5 to 4, the available alumina was over 38 grams, and the alumina-to-caustic ratios were very close to the desired .800. When calcined below about 2.5% residual ignition loss or to losses higher than 5%, there was a comparatively slight reduction in available alumina. However, the trihydrate available alumina increased very substantially on the calcine in run 12 over the values obtained upon digestion of the raw Jamaica bauxite as shown in run 11, the conditions of these runs being directly comparable.

Thus, it may be seen that the present invention provides a means for extracting a maximum of the alumina available under trihydrate digestion conditions from ores containing mixtures of alumina trihydrate and monohydrate. The maximum charging ratios of the conventional American Bayer process of from about .800 to .850 are obtained with a minimum loss of soluble alumina, and reversion of trihydrate to monohydrate is substantially completely inhibited under digestion conditions of temperature and time consistent with adequate desilication.

In the claims:

1. In a process for the extraction of alumina from aluminous ores containing mixtures of trihydrate and monohydrate alumina wherein the major portion of the total available alumina is trihydrate by the wet alkali aluminate digestion method wherein substantially all of the trihydrate and only a portion of the monohydrate alumina is extracted, the improvement of inhibiting reversion of soluble alumina to insoluble monohydrate alumina, which comprises calcining the ore to a residual ignition loss of from about 2 to about 5% by weight of the ore prior to digestion in the caustic aluminate liquor.

2. In the wet alkali aluminate digestion method for extraction of alumina from aluminous ores, wherein the ores contain mixtures of trihydrate and monohydrate alumina, the major portion being trihydrate, and wherein the digestion liquor after extraction contains undissolved monohydrate alumina, the step of inhibiting reversion of dissolved alumina to insoluble monohydrate alumina, which comprises calcining the ore to a residual ignition loss of from about 2.5 to about 4% by weight of the ore before extraction of the alumina therefrom.

3. A process for increasing the recovery of alumina from aluminous ores containing a major portion of the available alumina as trihydrate and a minor portion as monohydrate, wherein the ores are digested in caustic aluminate liquor to extract the alumina therefrom and to impart a weight ratio of alumina to caustic to the pregnant liquor of from about .800 to about .850, said digestion being conducted under conditions of caustic concentration and temperature such that undissolved monohydrate alumina is contained in the liquor after digestion, the step of inhibiting loss of soluble alumina by reversion thereof to insoluble monohydrate alumina, which comprises subjecting the ore to a predigestion calcination to obtain a partially calcined residue having a residual ignition loss of from about 2 to about 5% by weight of the ore.

4. A process according to claim 3 in which the calcined ore is digested at about 140 to 170° C. in the caustic aluminate liquor having a caustic concentration not exceeding about 160 grams per liter, and for a time sufficient for desilication of the digest liquor.

5. A process for the extraction of alumina from aluminous ores containing a major portion of the available alumina in the form of trihydrate and a minor portion in the form of monohydrate, wherein the ore is digested in caustic aluminate liquor under conditions of caustic concentration and temperature to produce a pregnant liquor having a weight ratio of alumina to caustic of from about .800 to about .850 by extraction of substantially all of the trihydrate alumina and only a portion of the monohydrate alumina, the step of inhibiting reversion of soluble alumina to insoluble monohydrate alumina, which comprises subjecting the ore prior to digestion to calcination to obtain a partially calcined ore having a residual ignition loss of from about 2.5 to about 4% by weight of the ore.

6. A process according to claim 5 in which the calcined ore is digested at about 140 to 170° C. in caustic aluminate liquor having a caustic concentration not exceeding about 160 grams per liter and for a time sufficient for desilication of the digest liquor.

7. In a process for the extraction of alumina from aluminous ores containing mixtures of alumina trihydrate and alumina monohydrate wherein the major portion of the alumina is trihydrate, by digesting the ore with caustic aluminate liquor to extract substantially all of the trihydrate alumina and only a portion of the monohydrate alumina, and for a time sufficient for desilication of the liquor, said digestion being characterized by loss of a significant amount of soluble alumina by reversion to insoluble monohydrate alumina, the improvement which comprises calcining the ore to a residual ignition loss of from about 2 to about 5% by weight of the ore prior to digestion thereof whereby the alumina of the ore may be extracted to a weight ratio of alumina to caustic in the pregnant liquor of at least about .800 while inhibiting reversion of soluble alumina to insoluble monohydrate.

8. A process according to claim 7 in which the ore is calcined at temperatures of from about 450 to about 525° C.

9. In the extraction of alumina from aluminous ores containing a major portion of the available alumina in the form of trihydrate and the balance in the form of monohydrate by digestion in caustic aluminate liquor under conditions of caustic concentration, temperature, and alumina to caustic weight ratio in the pregnant liquor such that undissolved monohydrate alumina is contained in the ore residue after digestion, the step which comprises subjecting the ore to a predigestion calcination at temperatures of from about 400 to 550° C. to obtain a partially calcined ore having a residual ignition loss of from about 2 to about 5% by weight of the ore whereby upon digestion of said calcined ore a maximum of alumina is extracted and reversion of soluble alumina to insoluble monohydrate in the presence of undissolved monohydrate alumina is substantially inhibited.

10. A process according to claim 9 in which the ore is calcined at from about 450 to about 525° C. to a residual ignition loss of from about 2.5 to about 4%.

11. A process for inhibiting reversion of soluble alumina to insoluble monohydrate alumina and for increasing the solubility of monohydrate alumina upon digestion of an aluminous ore containing a major portion of the available alumina as trihydrate and a minor portion as monohydrate in caustic aluminate liquor, wherein undissolved monohydrate alumina is contained in the ore residue slurry in the pregnant liquor after digestion, which comprises calcining the ore to obtain a partial calcine having a residual ignition loss of from about 2 to about 5% by weight of the ore, and thereafter digesting the ore in the caustic aluminate liquor.

12. A process according to claim 11 in which the mixed ore contains from about 70 to about 95% of the total available alumina as trihydrate.

JOHN L. PORTER.

References Cited in the file of this patent

UNITED STATES PATENTS

| Number | Name | Date |
|---|---|---|
| 1,422,004 | Sherwin | July 4, 1922 |
| 2,181,669 | Scholder | Nov. 28, 1939 |
| 2,244,194 | Haglund | June 3, 1941 |

FOREIGN PATENTS

| Number | Country | Date |
|---|---|---|
| 299,072 | Germany | Feb. 23, 1918 |
| 451,090 | Great Britain | July 29, 1936 |

OTHER REFERENCES

Tiemann, "Extraction of Alumina from Haiti and Jamaica Bauxites," Journal of Metals, vol. 3, May 1951, pages 389–393, St. Louis Meeting, February 1951.

Edwards et al., "The Aluminum Industry," subtitle "Aluminum and its Production," vol. 1, pages 128–129, 139 and 147, McGraw-Hill Book Co., N. Y. (1930.)